US012390956B1

United States Patent
Wang et al.

(10) Patent No.: US 12,390,956 B1
(45) Date of Patent: Aug. 19, 2025

(54) LATTICE-STRUCTURED CONCRETE THREE-DIMENSIONAL (3D) PRINTING METHODS FOR COMPONENT FORMING

(71) Applicants: HANGZHOU GUANLI INTELLIGENT TECHNOLOGY CO., LTD., Zhejiang (CN); ZHEJIANG UNIVERSITY, Zhejiang (CN)

(72) Inventors: Hailong Wang, Hangzhou (CN); Xiqiang Lin, Hangzhou (CN); Guanfei Tian, Hangzhou (CN); Lan Lu, Hangzhou (CN); Xiaoyan Sun, Hangzhou (CN); Kemeng Bao, Hangzhou (CN); Ming Xia, Hangzhou (CN); Meng Zhang, Hangzhou (CN)

(73) Assignees: HANGZHOU GUANLI INTELLIGENT TECHNOLOGY CO., LTD., Hangzhou (CN); ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 19/174,848

(22) Filed: Apr. 9, 2025

(30) Foreign Application Priority Data

Sep. 19, 2024 (CN) .......................... 202411305201.2

(51) Int. Cl.
*B28B 1/00* (2006.01)
*B33Y 10/00* (2015.01)
*B33Y 50/00* (2015.01)

(52) U.S. Cl.
CPC ............... *B28B 1/001* (2013.01); *B33Y 10/00* (2014.12); *B33Y 50/00* (2014.12)

(58) Field of Classification Search
CPC ...... B28B 1/001; B29C 64/112; B29C 64/118; B29C 64/188; B29C 64/209;
(Continued)

(56) References Cited

U.S. PATENT DOCUMENTS

2018/0071949 A1 3/2018 Giles
2024/0116250 A1* 4/2024 Wan .................. B33Y 50/02

FOREIGN PATENT DOCUMENTS

CN 107379531 11/2017
CN 109159427 1/2019
(Continued)

OTHER PUBLICATIONS

First Office Action in Chinese Application No. 202411305201.2 mailed on Oct. 31, 2024, 13 pages.
(Continued)

*Primary Examiner* — JaMel M Nelson
(74) *Attorney, Agent, or Firm* — Porus IP LLC

(57) ABSTRACT

Provide is a lattice-structured concrete 3D printing method for large-scale component forming. The method includes: S1, obtaining 3D data of a component to be printed and establishing a 3D model of the component to be printed, wherein the 3D data includes a coordinate set of all points and lines of the component to be printed in a 3D space; S2, obtaining a print head configuration and setting a printing parameter; S3, obtaining the printing parameter and generating lattice information of the 3D model using an improved slicing algorithm based on a feature of the component to be printed; S4, controlling one or more print heads to perform 3D printing based on the lattice information; and S5, post-processing a printed component to obtain a finished product. The method can be applied to 3D printing and forming of concrete structures.

7 Claims, 5 Drawing Sheets

(58) Field of Classification Search
CPC ..... B29C 64/386; B29C 64/393; B33Y 10/00; B33Y 30/00; B33Y 50/00; B33Y 50/02
See application file for complete search history.

(56) References Cited

FOREIGN PATENT DOCUMENTS

| | | | |
|---|---|---|---|
| CN | 113626911 A | | 11/2021 |
| CN | 113795388 | | 12/2021 |
| CN | 114834045 | | 8/2022 |
| CN | 115157656 | | 10/2022 |
| CN | 116401725 A | * | 7/2023 |

OTHER PUBLICATIONS

Notification to Grant Patent Right for Invention in Chinese Application No. 202411305201.2 mailed on Jan. 1, 2025, 5 pages.

* cited by examiner (a)

(b)

(c)

(d)

(a)

(b)

(c)

LATTICE-STRUCTURED CONCRETE THREE-DIMENSIONAL (3D) PRINTING METHODS FOR COMPONENT FORMING

CROSS-REFERENCE TO RELATED APPLICATIONS

This application claims priority to the Chinese Patent Application No. 202411305201.2, filed on Sep. 19, 2024, the entire contents of which are incorporated herein by reference.

TECHNICAL FIELD

The present disclosure relates to a technical field of processing cement, clay or stone, and in particular, relates to a lattice-structured concrete 3D printing method for large-scale component forming.

BACKGROUND

Concrete is one of the most essential civil engineering materials in modern times. It boasts advantages such as abundant raw materials, low cost, and simple production processes, as well as characteristics like high compressive strength, excellent durability, and a wide range of strength grades. These properties make concrete not only widely used in various civil engineering projects but also applicable in numerous related industries, supporting the rapid development of society. However, concrete is also a material with high energy consumption and pollution. To fully leverage its advantages and mitigate its negative impacts, 3D printing concrete technology based on 3D printing has become a focal point of attention.

Concrete 3D printing technology is an interdisciplinary field integrating computer graphics, mechanical part design and manufacturing, assembly processes, automated control, precision CNC, concrete materials, fluid mechanics, and more. It offers benefits such as high efficiency, formwork-free construction, labor savings, material conservation, and low-carbon environmental friendliness. This technology is not only suitable for traditional architectural design and construction but also enables the creation of various aesthetically pleasing and irregular curved structures.

The prior art has already disclosed discussions on 3D printing concrete. For example, CN118305866A discloses a multi-line 3D printed concrete structure and a construction method thereof. The method includes preparing concrete printing materials, designing a 3D printing model based on the shape of a concrete structure to be printed. The designed 3D printing model includes outer contour lines and internal structural lines tightly adhering to the outer contour lines. A piece of 3D printing equipment is then used to sequentially print the outer contour lines and internal structural lines according to the designed model, forming a multi-line 3D printed concrete structure. This prior art discusses at least a double-layer line 3D printed concrete structure, where the outer contour lines serve as the structure's outline, and the internal structural lines act as internal support for the outer contour lines. While this is a viable 3D printing mode in practical applications, it imposes certain requirements on the size of the print head. Otherwise, the contours are prone to collapsing or tilting during the printing of a single outline, leading to deformation of the overall model. Additionally, the method demands higher printing speeds and continuous printing capabilities, as well as stricter requirements for on-site construction conditions.

Therefore, it is desired to propose a lattice-structured concrete 3D printing method for large-scale component forming. By optimizing a slicing algorithm, a component to be printed is processed layer by layer into a lattice, where each point serves as a working point for a print head to pause, significantly improving a printing height of each points.

SUMMARY

One or more embodiments of the present disclosure provide a lattice-structured concrete three-dimensional (3D) printing method for large-scale component forming. The method comprises: S1, obtaining 3D data of a component to be printed and establishing a 3D model of the component to be printed; the 3D data including a coordinate set of all points and lines of the component to be printed in a 3D space; S2, obtaining a print head configuration and setting a printing parameter; S3, obtaining the printing parameter and generating lattice information of the 3D model using an improved slicing algorithm based on a feature of the component to be printed; S4, controlling one or more print heads to perform 3D printing based on the lattice information; and S5, post-processing a printed component to obtain a finished product.

In some embodiments, step S3 includes:
S3.1, obtaining a slump degree of a printing concrete material; S3.2, determining, based on the slump degree, a minimum circumscribed circle on a horizontal plane and a height h formed by a unit extrusion amount of the printing concrete material within a preset time; initializing j=1.
S3.3, initializing i=1, $N_j$=0.
S3.4, obtaining, based on the minimum circumscribed circle and the height, an i-th layer contour of a j-th sub-component to be printed from bottom to top, and generating a first point arrangement graph by tangentially arranging points within and along the i-th layer contour using the minimum circumscribed circle, wherein outermost points of the first point arrangement graph are connected to form a bottom contour.
S3.5, calculating, based on the first point arrangement graph and a height of a current layer, an extrusion amount required to supplement the printing concrete material at positions other than a contour of the current layer, wherein extrusion points for supplementing the printing concrete material form a second point arrangement graph.
S3.6, calculating a corrected height after supplementing the printing concrete material to obtain a slice height hi of the i-th layer.
S3.7, calculating a total slice height $H_{temp}$ of a current sub-component to be printed, and if $H_{temp}$ is less than a height H of the current sub-component to be printed and $(H-H_{temp})/h > \alpha$, $\alpha \in (1, 1.5]$, incrementing i by 1 and returning to S3.4; otherwise, proceeding to S3.8.
S3.8, designating a value of $H-H_{temp}$ as a height limit, calculating an extrusion amount of the printing concrete material based on the slump degree of the printing concrete material to obtain a temporary minimum circumscribed circle, and generating a third point arrangement graph based on the temporary minimum circumscribed circle; incrementing i by 1, assigning a value of $N_j+i$ to $N_j$, and proceeding to S3.9.
S3.9, if unsliced sub-components to be printed exist, incrementing j by 1 and returning to S3.3; otherwise, proceeding to S3.10.

S3.10, constructing a lattice information set for N layers of the component to be printed, wherein $$N = \sum_{j=1}^{J} N_j,$$

and J denotes a total count of sub-components to be printed.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein.

DETAILED DESCRIPTION

Figure 1:
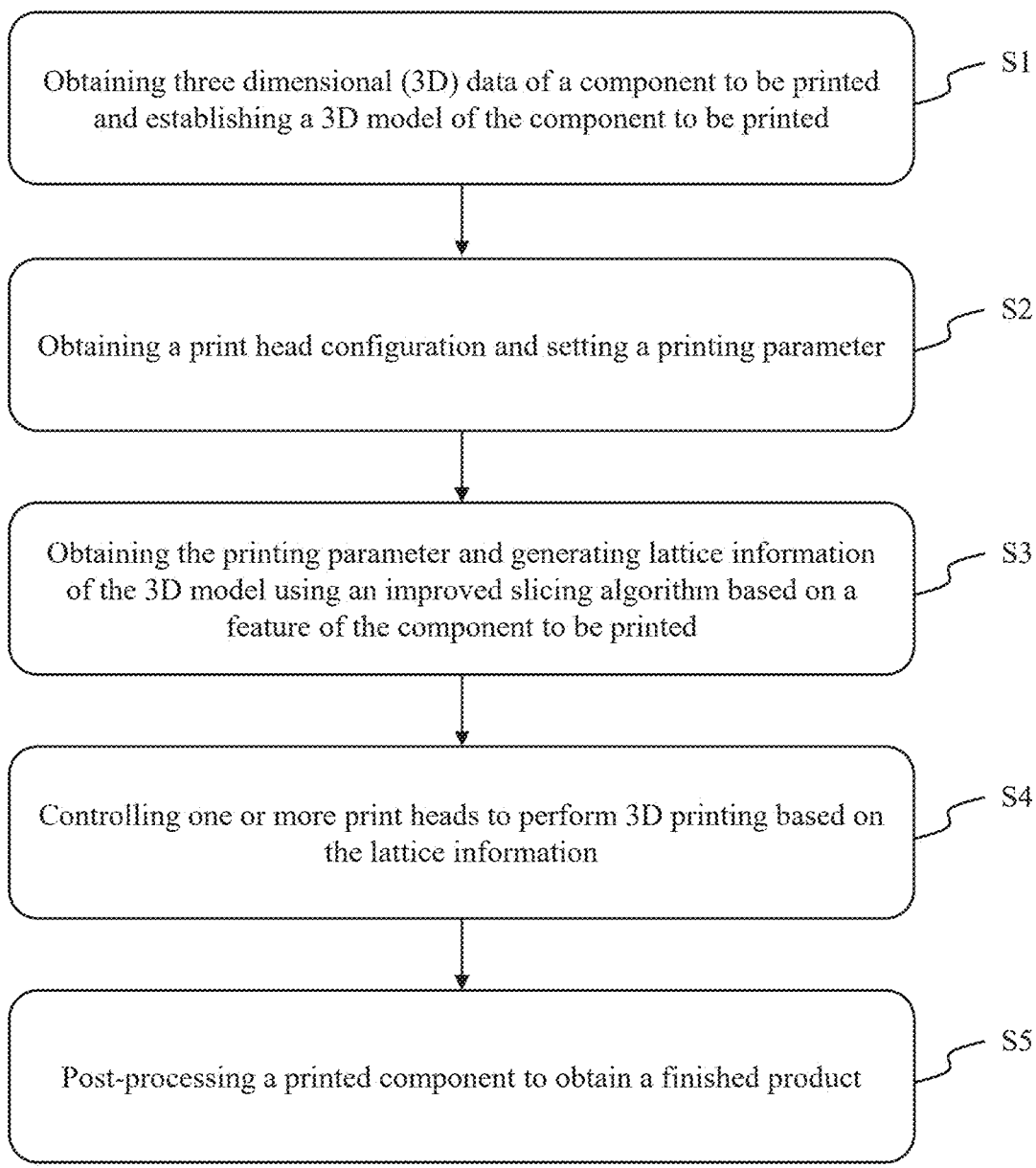
FIG. 1 is a flowchart of an exemplary process of a lattice-structured concrete 3D printing method for large-scale component forming according to some embodiments of the present disclosure.

In order to provide a clearer understanding of the technical solutions of the embodiments described in the present disclosure, a brief introduction to the drawings required in the description of the embodiments is given below. It is evident that the drawings described below are merely some examples or embodiments of the present disclosure, and for those skilled in the art, the present disclosure may be applied to other similar situations without exercising creative labor. Unless otherwise indicated or stated in the context, the same reference numerals in the drawings represent the same structures or operations.

It should be understood that the terms "system," "device," "unit," and/or "module" used herein are ways for distinguishing different levels of components, elements, parts, or assemblies. However, if other terms can achieve the same purpose, they may be used as alternatives.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate the operations performed by the system according to the embodiments described herein. It should be understood that the operations may not necessarily be performed in the exact sequence depicted. Instead, the operations may be performed in reverse order or concurrently. Additionally, other operations may be added to these processes, or one or more operations may be removed.

FIG. 1 is a flowchart of an exemplary process of a lattice-structured concrete three-dimensional (3D) printing method for large-scale component forming according to some embodiments of the present disclosure. As shown in FIG. 1, process 100 includes following steps.

In some embodiments, process 100 may be executed by a processor. The processor may include one or more sub-processing devices (e.g., a single-core processing device or a multi-core processing device). Merely by way of example, the processor may include a central processing unit (CPU), an application-specific integrated circuit (ASIC), etc., or any combination of the above.

S1, obtaining 3D data of a component to be printed and establishing a 3D model of the component to be printed; S2, obtaining a print head configuration and setting a printing parameter; S3, obtaining the printing parameter and generating lattice information of the 3D model using an improved slicing algorithm based on a feature of the component to be printed; S4, controlling one or more print heads to perform 3D printing based on the lattice information; and S5, post-processing a printed component to obtain a finished product.

In some embodiments, a component to be printed is defined, and a 3D model of the component to be printed is established. The 3D model refers to that the component to be printed is placed in a preset 3D coordinate system, and the processor may locate a position of each point of the component to be printed through 3D coordinates. Based on an objectively set print head parameter and data of a corresponding printing concrete material, the 3D model is sliced layer by layer using an improved slicing algorithm. Then lattice information of printouts in a form of "points" is obtained, and each layer of the component to be printed is covered by a lattice. In other words, the 3D model is sliced layer by layer and processed into a lattice composed of spatial points at intervals. The construction of the lattice in a Z-axis direction is completed by superposition, and the print head is called for printing based on the lattice information.

Specifically, each point of the lattice corresponds to a concrete extrusion position of the print head, and a concrete 3D printer recognizes 3D printing points and determines the printing parameter for each point, including a point spacing, a printing height, a material extrusion amount, and a movement speed, to accommodate yield stress and thixotropy of the printing concrete material. The print head of the concrete 3D printer follows a generated lattice path and extrudes the printing concrete material, stacking layer by layer to form a component or a structure. The printing height of each point is generally several times of a printing height of traditional line slicing. When an extrusion height of the print head reaches a design height, the print head stops extruding and moves to a next point to continue extruding and printing until all points in a current layer are printed. The print head then moves up to a next slicing layer above the current layer to continue printing.

Finally, the printed component is post-processed according to conventional concrete post-processing techniques.

In the following, each step will be further explained in detail.

In S1, obtaining 3D data of a component to be printed, and establishing a 3D model of the component to be printed.

The component to be printed refers to a concrete structure or a building part that is ready to be molded by 3D printing technology.

The 3D data includes a coordinate set of all points and lines of the component to be printed in a 3D space. In some embodiments, to ensure printing effectiveness and the convenience of setting up the lattice, the processor may use intersection points of a plurality of lines as points, obtain information of the lines between the points, and construct a coordinate set to form the 3D data. The lines may include straight lines and curved lines, corresponding to planes and curved surfaces, respectively.

In some embodiments, the processor may generate the 3D model of the component to be printed based on the 3D data, using modeling software for data processing and geometry construction. The modeling software may include AutoCAD, Rhinoceros, SolidWorks, etc.

In S2, obtaining a print head configuration and setting a printing parameter.

The print head configuration includes single print head operation or multiple print heads operating in parallel. The single print head operation may be used to print relatively thin profile surfaces. The multiple print heads operating in parallel may be used to print relatively thick profile surfaces, a component to be printed with a large count of points, a hollow wall, etc. An application scope of the multiple print heads operating in parallel is broader. In some embodiments, the processor may obtain the print head configuration directly from factory parameters of the printer.

The printing parameter includes a print point sparsity, a printing height, etc., to accommodate the yield stress and the thixotropy of the printing concrete material. The print point sparsity is also referred to as the point spacing. The printing parameter may further include basic properties of the printing concrete material to ensure that the printing concrete material may be applied at a relatively high single-point height. The printing parameter further includes the material extrusion amount of the printing concrete material and the movement speed of the print head to ensure effective printing. In some embodiments, the printing parameter may be set by a technician based on demand or set by default by the processor.

The printing concrete material refers to a raw concrete material used for 3D printing.

In S3, obtaining the printing parameter to generate lattice information of the 3D model using an improved slicing algorithm based on a feature of the component to be printed.

The improved slicing algorithm refers to an algorithm that cuts the 3D model of the component to be printed into two-dimensional (2D) slices layer by layer by height, and each layer consists of discrete points. Using the improved slicing algorithm, lattice information composed of discrete points can be generated for each layer of the 3D model.

In some embodiments, the processor may use the improved slicing algorithm to perform layer-slicing on the 3D model based on the feature of the component to be printed. Each layer of the 3D model is processed into a lattice composed of spatial points at intervals. That is to say, the lattice covers each layer of the component to be printed, and the lattice information is generated layer by layer.

In some embodiments, the processor divides the component to be printed into a plurality of sub-component to be printed in different ways based on the feature of the component to be printed, generates the lattice information corresponding to the plurality of sub-component to be printed, and ensures a structural integrity of the component to be printed by using partition layers if the sub-components to be printed are hollow or using dense fillings if the sub-components to be printed are not hollow. More descriptions of the feature of the component to be printed may be found in related descriptions below.

In some embodiments, the lattice information may include a coordinate of each print point (i.e., each extrusion point of the printing concrete material corresponding to the print head).

Figure 2:
FIG. 2 is an exemplary schematic diagram illustrating the layer-slicing of a component to be printed and the generation of lattice information according to some embodiments of the present disclosure.
Figure 2:
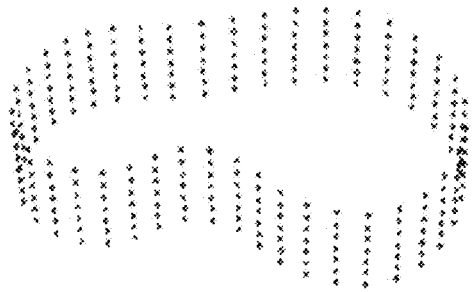
Figure 2:
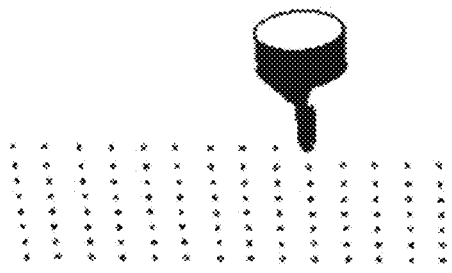
Figure 2:
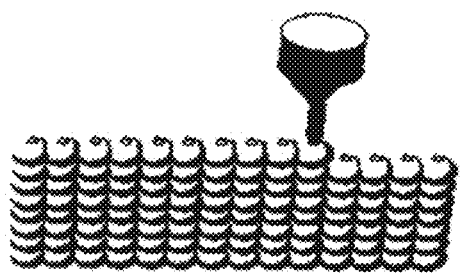

FIG. 2 is an exemplary schematic diagram illustrating the layer-slicing of a component to be printed and the generation of lattice information according to some embodiments of the present disclosure.

In some embodiments, as shown in FIG. 2, (a) represents the component to be printed. Taking a contour of the component to be printed as an example, as shown in (b) of FIG. 2, the contour of the component to be printed is converted into a lattice, and an internal structure of each layer is similarly processed into a lattice, ultimately forming a 3D model composed of lattices. If the component to be printed is a non-hollow structure, only the contour needs to be processed into a lattice, and the internal structure may be filled with concrete. (c) in FIG. 2 shows a working position of a print head corresponding to the lattice, and an effect after the extrusion of a printing concrete material is shown in (d) of FIG. 2.

Figure 3:
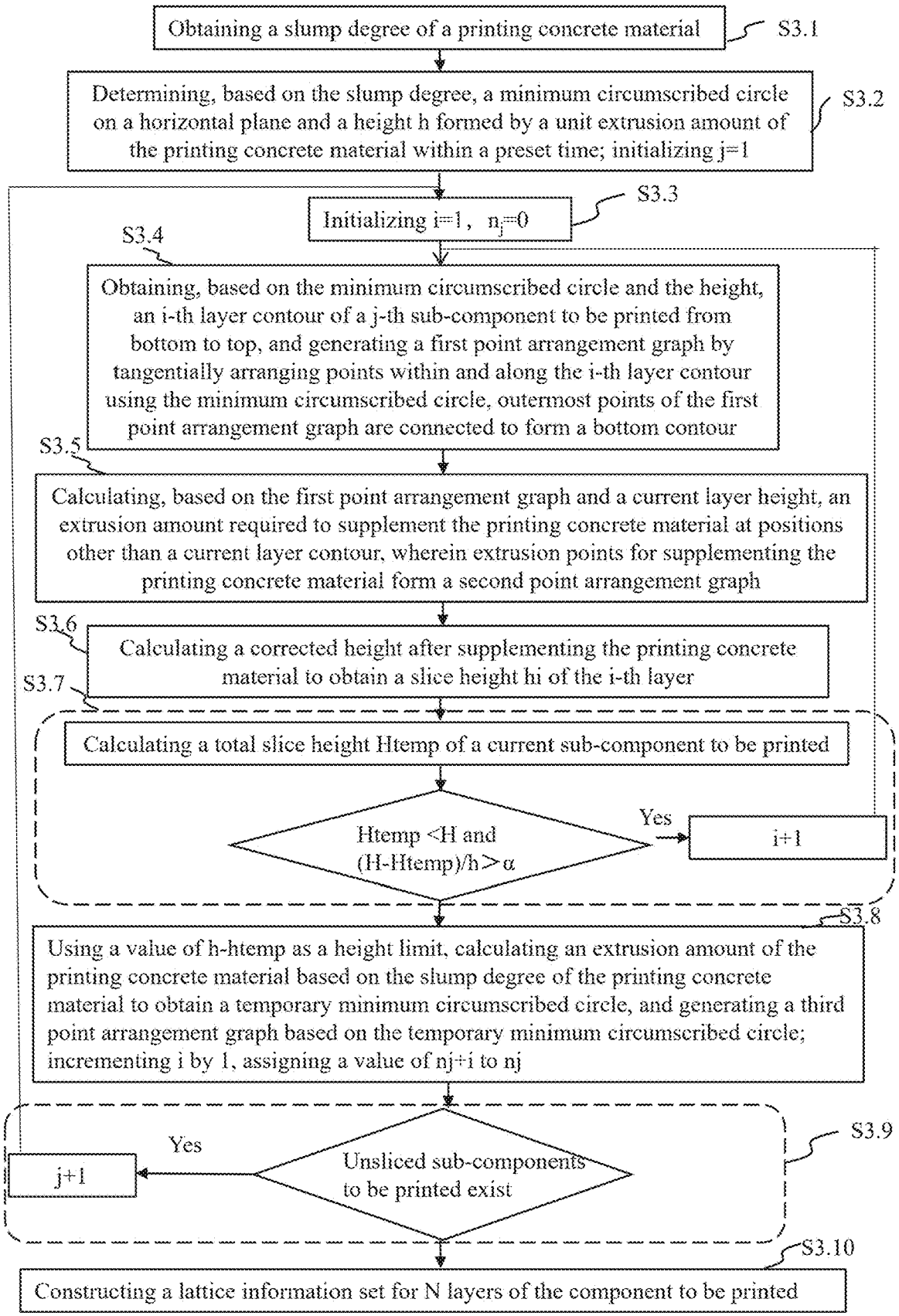
FIG. 3 a flowchart of an exemplary process for generating lattice information of a corresponding 3D model using an improved slicing algorithm according to some embodiments of the present disclosure.

FIG. 3 a flowchart of an exemplary process for generating lattice information of a corresponding 3D model using an improved slicing algorithm according to some embodiments of the present disclosure. As shown in FIG. 3, step S3: obtaining the printing parameter and generating lattice information of the 3D model using an improved slicing algorithm based on features of the component to be printed, includes the following steps:

In S3.1, obtaining a slump degree of the printing concrete material.

The slump degree is an indicator used to measure fluidity of the printing concrete material. The larger the slump degree is, the higher the fluidity of the printing concrete material is. In some embodiments, a processor may directly obtain the slump degree from factory parameters of the printing concrete material.

In some embodiments, when the printing concrete material is printed in a lattice pattern, a printing height of each point may be multiple times of a width of an extrusion nozzle of the print head. Additionally, a single-layer printing height in a Z-axis direction (i.e., a direction perpendicular to a slicing direction) depends on yield stress and thixotropy of the concrete or mortar. An appropriate printing height ensures self-supporting and stability of a printed structure. The single-layer printing height is positively correlated with the yield stress and the thixotropy. To achieve better printing results, an amount of printing concrete material extruded by the print head is very small (e.g., less than a preset value), allowing the printing concrete material to be shaped more effectively.

In some embodiments, the slump degree may cause a degree of height variation in the extruded printing concrete material. Since the extruded printing concrete material is generally in a shape of a circular disc, after filling gaps between adjacent discs, a degree of height variation may occur due to force interactions until stability is achieved. Therefore, the slump degree of the printing concrete material needs to be accounted for during a layer-slicing process.

In S3.2, determining, based on the slump degree, a minimum circumscribed circle on a horizontal plane and a height h formed by a unit extrusion amount of the printing concrete material within a preset time; initializing j=1.

The minimum circumscribed circle refers to a smallest enclosing circle of a pie-shaped structure formed by placing the unit extrusion amount of the printing concrete material on the horizontal plane after the printing concrete material is placed on a horizontal plane and allowed to naturally spread over a preset time. The unit extrusion amount refers to an amount of printing concrete material extruded by a single print head in a single operation.

The higher the slump degree is, the larger an outer diameter (i.e., a diameter) of the minimum circumscribed circle is.

The height h refers to a theoretical design height of a single printing layer, reflecting an actual formed height of the printing concrete material in ta vertical direction after extrusion, taking into account a settlement effect due to slump.

j denotes an identification number of the sub-component to be printed, and initializing j=1 indicates that processing starts from a first sub-component to be printed.

In some embodiments, in S3.2, the processor may determine, based on the slump degree of the printing concrete material, the corresponding minimum circumscribed circle and height h by querying a first predetermined relationship table. The first predetermined relationship table may be constructed by a technician or the processor based on historical data, and the first predetermined relationship table includes a plurality of slump degrees and minimum circumscribed circles and heights h corresponding to the slump degrees.

In some embodiments, in S3.2, to determine the minimum circumscribed circle and the height h, the processor may be configured to: obtain environmental monitoring data based on an environmental monitoring device; determining the minimum circumscribed circle and the height h based on the environmental monitoring data, the slump degree, the printing concrete material, the unit extrusion amount, a printing speed, and print head data.

The environmental monitoring device may include a temperature sensor, a humidity sensor, etc. The environmental monitoring data may include environmental temperature data, environmental humidity data, etc., of a printing environment.

The print speed refers to a speed at which the print head completes a single print. In some embodiments, the unit extrusion amount and the print speed may be set by system default or by a technician based on experience.

The print head data may include a material, a shape, a size, etc., of the print head.

In some embodiments, the processor may determine the minimum circumscribed circle and the height h, based on the environmental monitoring data, the slump degree, the printing concrete material, the unit extrusion amount, the print speed, and the print head data via a shape determination model.

In some embodiments, the shape determination model is a machine learning model. For example, the shape determination model may be a Recurrent Neural Network (RNN), etc.

In some embodiments, inputs of the shape determination model may include environmental monitoring data, the slump degree, the printing concrete material, the unit extrusion amount, the print speed, and the print head data, and outputs of the shape determination model may include a radius of the minimum circumscribed circle and the height h.

In some embodiments, the shape determination model may be obtained through training based on a large number of first training samples with first labels. The processor may input a plurality of first training samples with the first labels into an initial shape determination model, construct a loss function based on results of the initial shape determination model and the first labels, and iteratively update the initial shape determination model based on the loss function. The training of the initial shape determination model training is completed when a preset condition is satisfied, and a trained shape determination model is obtained. The preset condition may include the loss function converging, a count of iterations reaching a threshold, etc.

A set of first training samples may include sample environmental monitoring data, a sample slump degree, a sample printing concrete material, a sample unit extrusion amount, a sample print speed, and sample print head data. The first training samples may be obtained based on historical data. The first labels may be radiuses of the minimum circumscribed circle and heights h recorded from actual observations.

In some embodiments of the present disclosure, the minimum circumscribed circle and the height h are determined by combining a plurality of factors such as the environmental monitoring data, the slump degree, the properties of the printing concrete material, the unit extrusion amount, the printing speed, and the print head data, which can fully take into account influences of different environmental conditions and material properties on the minimum circumscribed circle and the height h, thereby improving printing accuracy and component quality.

In some embodiments, the sub-components to be printed are associated with a feature of the component to be printed, the feature of the component to be printed includes whether the component to be printed is hollow. If the component to be printed is hollow, each of the sub-components to be printed has an independent hollow space, and partition layers are arranged between a plurality of adjacent sub-components to be printed. If the component to be printed is non-hollow, the sub-components to be printed are non-hollow, and the component to be printed is divided into a plurality sub-components to be printed based on a visible horizontal plane of the component to be printed in a horizontal projection plane.

In some embodiments, hollow components to be printed are typically architectural components. The corresponding sub-components to be printed have independent hollow spaces. When an architectural component has a multi-layer structure, partition layers are arranged between a plurality of adjacent sub-components to be printed. In other words, the component to be printed includes the sub-components to be printed and partition layers arranged between more than two sub-components to be printed. Each of the sub-components to be printed is a hollow structure, each of the partition layers is solid layer, and the partition layer is filled with concrete to enhance an overall strength.

In some embodiments, non-hollow components are typically solid concrete products (e.g., a precast beam, a concrete step, etc.). Based on the visible horizontal plane of the component to be printed in the horizontal projection plane, the component to be printed is divided into a plurality of sub-components along the horizontal plane. For example, after placing a largest visible horizontal plane on a predetermined workstation, parts with significantly inconsistent edges (e.g., parts with edge differences greater than a preset threshold) are separated until the division is completed, thus obtaining a plurality of sub-components. Each sub-component is a solid structure, and concrete is filled in directly to ensure internal density.

After each of the plurality of sub-components to be printed is matched with corresponding 3D model data, 3D information of the print point may be obtained.

Figure 4:
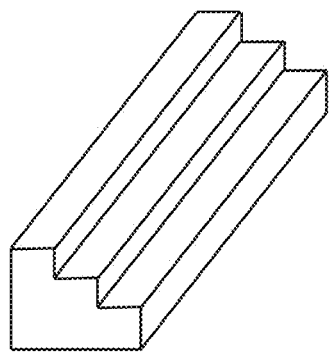
FIG. 4 is an exemplary schematic diagram illustrating the division of a component to be printed into sub-components to be printed according to some embodiments of the present disclosure.
Figure 4:
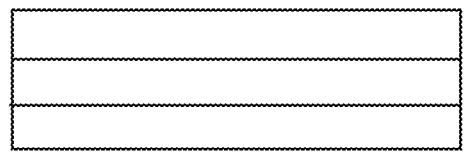
Figure 4:
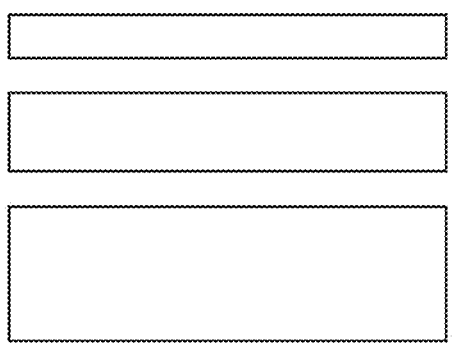

FIG. 4 is an exemplary schematic diagram illustrating the division of a component to be printed into sub-components to be printed according to some embodiments of the present disclosure.

In FIG. 4, (a) shows the component to be printed, which is a step structure; (b) shows the visible horizontal plane of the component in the horizontal projection plane; (c) shows top surfaces of sub-components to be printed corresponding to three layers of steps, from top to bottom.

In S3.3, initializing i=1 and $N_j$=0.

I represents an i-th layer of each sub-component to be printed, j represents a j-th divided sub-component to be printed, and $N_j$ represents a count of layers of the j-th sub-component to be printed. Initializing i=1 indicates that the process starts from a first layer of a current sub-component to be printed (i.e., the j-th sub-component to be printed), and during a layer-slicing process, i is incremented gradually (i=i+1) to traverse each layer of the sub-component to be printed. Initializing $N_j$=0 indicates that the count of layers has not been accumulated when the processing of the j-th sub-component to be printed starts. During the layer-slicing process, $N_j$ is incremented ($N_j$=$N_j$+1) after completing each layer slice, and an actual total count of layers of the sub-component to be printed is finally recorded.

Figure 5:
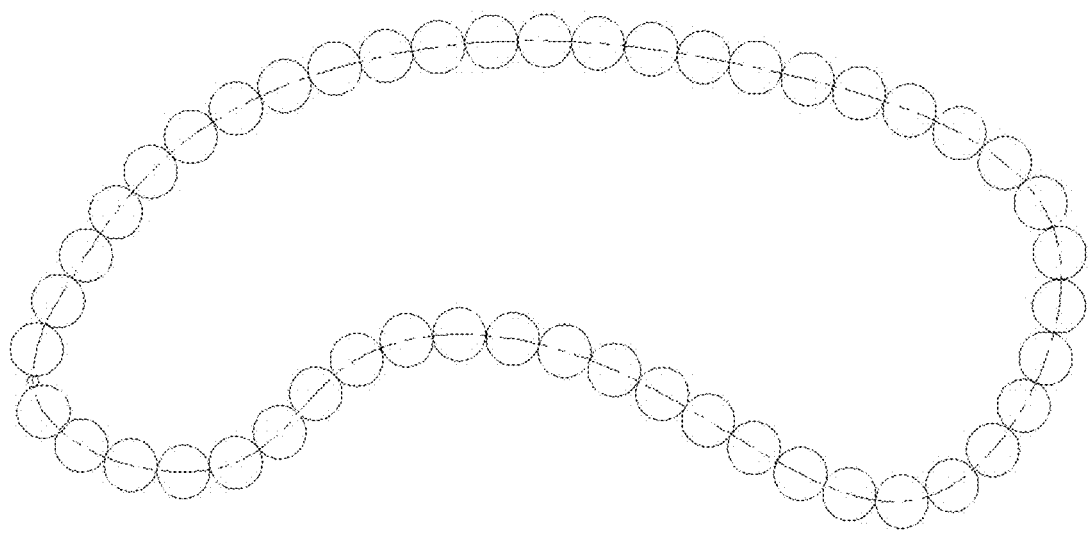
FIG. 5 is an exemplary schematic diagram illustrating an arrangement of points for a lattice-structured concrete 3D printing method for large-scale component forming according to some embodiments of the present disclosure.

In S3.4, obtaining, based on the minimum circumscribed circle and the height, an i-th layer contour of the j-th sub-component to be printed from bottom to top, and generating a first point arrangement graph by tangentially arranging points within and along the i-th layer contour using the minimum circumscribed circle, wherein outermost points of the first point arrangement graph are connected to form a bottom contour; as shown by the dashed line connecting the circles in FIG. 5.

The first point arrangement graph refers to a distribution of discrete lattice points arranged along the edge of the contour of current layer of the sub-component to be printed. The first point arrangement graph may be used to form a base support structure for the current layer, preventing contour deformation or tilting and providing precise positioning of an outer contour.

FIG. 5 is an exemplary schematic diagram illustrating an arrangement of points for a lattice-structured concrete 3D printing method for large-scale component forming according to some embodiments of the present disclosure. As shown in FIG. 5, the diagram includes a dashed line, a plurality of large circles on the dashed line, and a small circle between two large circles. The dashed line represents a current outline, the large circles correspond to the lattice points of the first point arrangement graph, and the small circle represents points (i.e., lattice points) corresponding to a second point arrangement graph.

In some embodiments, the processor may start layering from a bottom layer of each sub-component to be printed. Taking point arrangement for the bottom layer as an example, during the point arrangement process, a slumped disc-shaped printing concrete material is used as a distribution reference. Since an edge position of each layer and an outer diameter of the printing concrete material are both determined, the processor may directly arrange the minimum circumscribed circle tangent to a circumference of the printing concrete material at the edge of each layer, thereby obtaining the first point arrangement graph. A center of each extruded printing concrete is located at the edge of the bottom layer of the sub-component. The printing concrete outside the edge contour may be cut directly in the later stage of the process, and since the extrusion amount of the printing concrete material is small, the amount of printing concrete that needs to be cut is small.

In some embodiments, if there is no need to divide the component to be printed, the count of sub-components to be printed is 1.

In S3.5, calculating, based on the first point arrangement graph and a height of a current layer, an extrusion amount required to supplement the printing concrete material at positions other than the contour of the current layer, wherein extrusion points for supplementing the printing concrete material form the second point arrangement graph.

The second point arrangement graph refers to a distribution of extrusion points for supplementary the printing concrete material based on the first point arrangement graph. In some embodiments, the processor may, based on the first point arrangement graph, fill in spaces between the points in the first point arrangement graph with the printing concrete material, and the filling positions (i.e., the extrusion points) constitute the second point arrangement graph, as shown by the small circle in FIG. 5. The second point arrangement graph may be used to fill regions with insufficient material within the contour (i.e., regions not covered by the first point arrangement graph), ensuring density within the layer and correcting layer height errors caused by material slump.

In S3.6, calculating a corrected height after supplementing the printing concrete material to obtain a slice height hi of the i-th layer. The slice height is also referred to as a layer height.

The corrected height refers to an actual printing layer height adjusted based on an actual extrusion amount of the printing concrete material and interactions between layers.

In some embodiments, the processor may calculate the extrusion amount of the supplemental printing concrete material based on a spatial margin of each point in the second point arrangement graph, while ensuring a same layer height. In addition, after completing two prints of lattice points, the height of the current layer may fluctuate due to the interactions between the printing concrete materials at different points and the properties of the printing concrete material. Therefore, the actual slice height hi is obtained.

In some embodiments, the slice height hi may be obtained by the processor by performing an image analysis based on print monitoring images captured by an image acquisition device, such as a camera. The print monitoring images refer to images captured and recorded from a plurality of angles during the printing process.

In S3.7, calculating a total slice height $H_{temp}$ of a current sub-component to be printed, and if $H_{temp}$ is less than a height H of the current sub-component to be printed and $(H-H_{temp})/h > \alpha$, $\alpha \in (1, 1.5]$, incrementing i by 1 and returning to S3.4; otherwise, proceeding to S3.8. The height H of the current sub-component to be printed is also referred to as a design height of the current sub-component to be printed.

In some embodiments, the layer-slicing process continues if and only if the total slice height of all layers of the sub-component has not yet reached the planned height H and there is enough space to divide an additional layer. The value of a is related to the slump degree of the printing concrete material.

In some embodiments, the processor may determine the corresponding a based on the slump degree of the printing concrete material by querying the first predetermined relationship table described above. The first predetermined relationship table may further include a plurality of slump degrees and corresponding a values.

In some embodiments, the determination of the value of a in S3.7 may include: obtaining a printing height record; determining, based on the printing height record, an estimated layer height; and determining the value of a based on the estimated layer height and the slump degree.

The printing height record refers to height data for each layer recorded during printing. In some embodiments, the printing height record may include an actual height (i.e., the slice height hi) of the i-th layer and a theoretical design height (i.e., the height h).

The estimated layer height is an estimated height of the layer after the printing is complete.

In some embodiments, the processor may obtain the printing height record directly from historical data.

In some embodiments, the processor may determine the estimated layer height based on the printing height record in a variety of ways. For example, the processor may compute an average of the slice heights hi for the layers of the sub-component to be printed as the estimated layer height, denoted as $h_e$.

In some embodiments, the processor may determine the estimated layer height based on a printing height deviation, substrate material data, and environmental monitoring data. More descriptions of the environmental monitoring data may be found in related descriptions above.

The printing height deviation refers to a difference between the actual height and the design height of the layer caused by the slump degree of the printing concrete material. In some embodiments, the printing height deviation may be represented by an absolute value of a difference between an average value of the actual slice heights hi of the printed layers and the height h.

The substrate material data refers to information of a material contacted by a bottom surface of the current layer of the component to be printed during printing. For example, when printing a second layer, the substrate material data for the second layer is the printed concrete material of a first layer that a bottom of the second layer contacts.

In some embodiments, the processor may construct a height feature vector based on the printing height deviation, the substrate material data, and the environmental monitoring data; retrieve, in a vector database, a reference height feature vector that has a highest degree of similarity to the height feature vector; and determine a reference estimated layer height corresponding to the reference height feature vector as the estimated layer height.

In some embodiments, the vector database may be constructed by the processor or a technician based on the historical data, and the vector database includes a plurality of reference height feature vectors and corresponding reference estimated layer heights. The reference height feature vectors may be constructed based on reference printing height deviations, reference substrate material data, and reference environmental monitoring data of reference layers. The reference estimated layer height may be the actual printing height of a next layer of a reference layer corresponding to the reference height feature vector.

In some embodiments of the present disclosure, determining the estimated layer height based on the printing height deviation, the substrate material data, and the environmental monitoring data can more accurately reflect actual printing situations, reduce a height deviation caused by material characteristics, environmental changes, or printing errors, thereby improving printing accuracy and component quality.

In some embodiments, the processor may determine the value of a based on the estimated layer height $h_e$ and the height h. Merely by way of example, the value of a may be calculated by Equation (1):

$$\alpha = w \times \frac{h_e}{h}. \tag{1}$$

In Equation (1), w denotes a correction factor, w>1, and w is negatively correlated with the slump degree.

In some embodiments of the present disclosure, by dynamically determining the parameter a based on the printing height record, the estimated layer height, and the slump degree, the print layer height can be accurately adjusted to avoid printing errors due to the slump degree of the printing concrete material or deviation of the layer height, thereby ensuring the accuracy and quality of the component formation.

In S3.8, designating a value of $H-H_{temp}$ as a height limit, calculating the extrusion amount of the printing concrete material based on the slump degree of the printing concrete material to obtain a temporary minimum circumscribed circle, and generating a third point arrangement graph based on the temporary minimum circumscribed circle, incrementing i by 1, assigning a value of $N_{j+i}$ to $N_j$, and proceeding to S3.9.

The temporary minimum circumscribed circle refers to a minimum circumscribed circle obtained by temporarily adjusting the extrusion amount of the printing concrete material based on a residual height (i.e., $H-H_{temp}$) and the slump degree. A diameter of the temporary minimum circumscribed circle used to determine the third point arrangement graph is smaller than the diameter of the minimum circumscribed circle used to determine the first point arrangement graph.

The third point arrangement graph refers to a dense lattice point arrangement graph generated to finely control a final layer height when the total slice height approaches the design height of the current sub-component to be printed (i.e., $H_{temp} \approx H$). The third point arrangement graph may be used to avoid excessive material accumulation in the final layer, achieve precise layer height finishing, and ensure that overall dimensions of the component meet design requirements.

In some embodiments, when the total slice height of the sub-component to be printed does not reach the design height H but only one layer may be divided, it is necessary to adjust the layer height. That is to say, based on the height limit, the point spacing is reduced by reducing the extrusion amount of the printing concrete material to obtain a third point arrangement graph with denser points and a smaller extrusion height.

After completion, recording the obtained value of $N_j$.

In S3.9, if unsliced sub-components to be printed exist, incrementing j by 1 and returning to S3.3; otherwise, proceeding to S3.10.

In S3.10, constructing a lattice information set for N layers of the component to be printed, wherein $$N = \sum_{j=1}^{J} N_j,$$

and J denotes a total count of sub-components to be printed.

N refers to a sum of all $N_j$ values. The lattice information of each layer may include the first point arrangement graph and at least one of the second point arrangement graph and the third point arrangement graph, as well as an output amount of the printing concrete material corresponding to the each layer.

In some embodiments, the lattice information set includes coordinates of lattice points and an output amount of the printing concrete material corresponding to each of the lattice points.

The coordinates of the lattice points may be obtained directly based on the 3D model. The output amount of the printing concrete material for the lattice points includes an extrusion amount of the printing concrete material at each point in the first point arrangement graph and at least one of an extrusion amount of the supplemental printing concrete material at each extrusion point in the second point arrangement graph and an extrusion amount of the printing concrete material at each point in the third point arrangement graph. Descriptions of the first point arrangement graph, the second point arrangement graph, and the third point arrangement graph may be found in the related descriptions above.

In some embodiments, for the partition layers or the non-hollow sub-components to be printed, the printing concrete material is filled between lattice points in each layer, and a filled layer height after filling the printing concrete material is controlled to meet the design height of the current layer. The design height of the current layer is the height h.

In some embodiments, solid layers may include partition layers between a plurality of hollow sub-components to be printed and non-hollow sub-components to be printed. For the printing of the solid layers, it is only necessary to fill an outer surface with concrete material after printing, which facilitates controlling the layer height to conform to the design height.

In some embodiments, the lattice information any layer may be obtained by configuring one or more print heads.

In some embodiments, if a plurality of print heads are configured, for any layer of any sub-component to be printed, the printing of the first point arrangement graph, the second point arrangement graph, or the third point arrangement graph is completed by the plurality of print heads simultaneously.

In some embodiments, when a plurality of print heads are configured to print the first point arrangement graph, the second point arrangement graph, or the third point arrangement graph, if a distance between two adjacent print heads of the plurality of print heads exceeds a preset value, a steel mesh is placed between output points of the two adjacent print heads.

In some embodiments, the 3D printing process described above supports a dual-point printing technique. Especially for printing surfaces with relatively large thicknesses, using two side-by-side print heads for synchronous extrusion operations can improve printing efficiency. The extruded materials may contact each other or maintain a certain spacing to form a hollow wall structure. To enhance structural performance, the steel mesh be placed within the structure, and the placement can be done by a machine or manually.

In S4, controlling one or more print heads to perform 3D printing based on the lattice information.

In some embodiments, the processor may control the one or more print heads to perform 3D printing based on the lattice information and the printing parameter of each point.

In some embodiments, the processor may directly obtain the point spacing and the printing height in the printing parameter based on the lattice information. The printing parameter may also include a moving speed of each of the one or more print heads, a count of print heads in operation. The moving speed of the print head may be manually preset or set by system default. Further description of the printing parameter may be found in the relevant description of step S2.

In some embodiments, the processor may determine, based on the lattice information, the count of print heads in operation; determine, based on the count of print heads in operation and the printing parameter of the points, an operating parameter of each of the one or more print heads; and based on the operating parameter, control the one or more print heads to perform the 3D printing.

The count of print heads in operation refers to a count of print heads that are in a working condition.

The operation parameter of the print head refers to a parameter that controls a movement and a printing operation of the print head. In some embodiments, the operating parameter may include points that each print head is responsible for printing, as well as the lattice information and the printing parameter corresponding to the points.

In some embodiments, the processor may generate a printing path based on the lattice information using a preset algorithm; determine a complexity level of the printing path; and determine the count of print heads in operation based on the complexity of the printing path. The printing path refers to a route formed by connecting a sequence of the printing points. The preset algorithm may include a path planning algorithm, or the like.

In some embodiments, the complexity level of the printing path may include a count of turns, a proportion of straight segments, a distribution of corner angles, or the like. The count of turns refers to a count of times the print head changes direction within a layer, and the larger the count of turns is, the higher the complexity level is. The proportion of straight segments refers to a ratio of lengths of straight segments to a total length of the printing path, and the higher proportion of straight segments is, the lower the complexity level is. The distribution of corner angles refers to an angular distribution of corners in the printing path, and the wider the distribution of corner angles is, the higher the complexity level is.

In some embodiments, the processor may perform a weighted summation of the count of turns, the proportion of straight segments, and the distribution of corner angles, and determine the summed value as the complexity level of the printing path. Weights for the weighted summation may be set by a technician based on experience or by system default.

In some embodiments, the processor may determine the count of print heads in operation by querying a second predetermined relationship table based on the complexity level of the printing path. The second predetermined relationship table may be constructed by the technician or the processor based on historical data and includes a plurality of complexity levels and counts of print heads in operation corresponding to the complexity levels.

In some embodiments, the processor may evenly distribute the printing points of each layer to the print heads in operation, thereby determining the points each print head is responsible for printing in the operating parameter.

In some embodiments, the processor may control one or more print heads to perform 3D printing based on the operational parameter of the print head.

In some embodiments of the present disclosure, by determining the count print heads in operation and the operation parameter based on the lattice information, and considering the complexity level of the printing process, the accuracy of the printing path and extrusion volume is ensured. This enables precise control of the print heads' actions, thereby improving printing accuracy and component quality.

In some embodiments, S4 further includes determining, based on the print monitoring images, a printing effect record; and adjusting, based on the printing effect record, the moving speed of the print head and the count of print heads in operation for printing a next layer.

The printing effect record refers to recorded data of the printing effect for each layer. In some embodiments, the printing effect may be determined based on a geometric accuracy, a surface quality, an interlayer bond strength, and whether material properties are satisfactory.

The geometric accuracy is negatively correlated to a deviation between an actual size and a designed size of the component to be printed. The surface quality is positively related to a smoothness and a flatness of a surface of the component to be printed. The interlayer bond strength is a strength of a bond between adjacent print layers. Whether the material properties are satisfactory refers to whether a strength, a hardness, a toughness, etc., of the printing concrete material meet standards.

The moving speed of print head is a speed at which the print head moves.

In some embodiments, the processor may determine the printing effect record by an effect evaluation model. In some embodiments, the effect evaluation model is a machine learning model. For example, the effect evaluation model may be a Convolutional Neural Network (CNN) model, etc.

In some embodiments, inputs of the effect evaluation model may include the print monitoring images, the environmental monitoring data, and a print head operation trajectory, and outputs of the effect evaluation model may include the printing effect records of completed layers. Further description of the print monitoring images and the environmental monitoring data may be found in the related description of FIG. 3.

The print head operation trajectory refers to a trajectory of each print head during the printing process. In some embodiments, the processor may obtain the print head operation trajectory by reading recorded data of the printer, or by using a position sensor on the print head.

In some embodiments, the effect evaluation model may be obtained through training based on a large number of second training samples with second labels. A training process of the effect evaluation model is similar to the training process of the shape determination model, which is not repeated here.

In some embodiments, the second training samples of the effect evaluation model may include sample print monitoring images, sample environmental monitoring data, and sample print head operation trajectories. The second labels may be actual printing effect records. The actual printing effect may be determined based on an actual geometric accuracy, an actual surface quality, an actual interlayer bonding strength, and whether actual material properties are satisfactory.

In some embodiments, the processor may dynamically adjust the moving speed of the print head and the count of print heads in operation when printing the next layer in real time based on the printing effect. For example, the processor may reduce the moving speed of the print head and the count of print heads in operation in the printing effect is lower than a predetermined threshold, wherein the reduction in the moving speed of print head and the count of print heads in operation is negatively correlated to the printing effect. The predetermined threshold may be set by default by the processor or preset manually.

In some embodiments of the present disclosure, by determining the printing effect record based on the print monitoring images and adjusting the moving speed and the count of print heads in operation accordingly, it is possible to provide real-time feedback on the printing quality, correct printing deviations in a timely manner, and ensure the printing accuracy and quality of each layer.

In some embodiments, in S4, the component to be printed is printed at a predetermined workstation, and after completing the printing of each layer of the component to be printed, a top-view image of the current layer is acquired to locate and calibrate a cutting line.

In some embodiments, the processor may use an image processing algorithm (e.g., an edge detection algorithm and a feature matching algorithm) to compare an actual printed contour with a contour in the 3D model, position or calibrate the cutting line (in cases of overflow of the printing concrete material or deviation of the contour) to a position of the contour in the 3D model. The processor may transmit the cutting line to a cutting device (e.g., a robotic arm or a laser cutting device). Based on the cutting line, irregular edges are removed through cutting to ensure a flat surface for each layer, providing a stable foundation for subsequent printing. The calibrated cutting line can also reduce cumulative interlayer errors, preventing overall structural deformation. Additionally, the cutting line can serve as a positioning reference for subsequent leveling (e.g., grinding or plastering) of the printed component, improving the appearance and functionality of the finished product.

In the present disclosure, the lattice print head adopts a screw extrusion mechanism, which can uniformly stack mortar or concrete building materials with good thixotropy and supportability.

In some embodiments of the present disclosure, since the extruded disc-shaped printing concrete material may overflow, the cutting line needs to be located and calibrated after completing each layer of printing to achieve positional calibration, ensure no deviation, and facilitate subsequent cutting processes.

In S5, post-processing a printed component to obtain a finished product.

The finished product is a component to be printed that has completed printing.

In some embodiments, in S5, the post-processing includes leveling and curing the printed component based on the cutting line.

The leveling refers to processing a surface of the printed component to meet flatness requirements. In some embodiments, the leveling includes grinding, plastering, applying putty for leveling, or the like. The curing may include standard concrete curing operations (e.g., water spraying, covering with curing membranes, etc.) to ensure the full development of material strength.

In some embodiments of the present disclosure, by using the improved slicing algorithm, the 3D model is processed layer by layer into lattice paths, with each point serving as a printing extrusion point where the print head pauses. This significantly improves the printing height of each point. The method is not limited by the size of the print head, the printing speed, or continuous printing, significantly increasing single-layer height and printing speed. The method considers the yield stress and thixotropy of the printing concrete material to ensure self-supporting and stable printing. The method adapts to diverse printing requirements.

In some embodiments, the lattice-structured concrete 3D printing method for large-scale component forming may be applied to 3D printing and molding of concrete structures.

In some embodiments, the 3D printing and molding of concrete structures include 3D print rapid prototyping of house buildings, concrete components, concrete structures in geotechnical engineering, or the like.

Having thus described the basic concepts, it may be rather apparent to those skilled in the art after reading this detailed disclosure that the foregoing detailed disclosure is intended to be presented as illustrative example and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of the present disclosure.

Moreover, certain terminology has been configured to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be noted that in the foregoing description of embodiments of the present disclosure, various features are sometimes grouped together in a single embodiment, figure, or description thereof for the purpose of streamlining the disclosure aiding in the understanding of one or more of the various inventive embodiments. This way of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameter set forth in the written description and attached claims are approximations that may vary depending upon the desired properties sought to be obtained by a particular embodiment. In some embodiments, the numerical parameter should be construed in light of the number of reported significant digits and by applying ordinary rounding techniques. Notwithstanding that the numerical ranges and parameter setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrating of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A lattice-structured concrete three-dimensional (3D) printing method for component forming, comprising:
    S1, obtaining 3D data of a component to be printed and establishing a 3D model of the component to be printed, the 3D data including a coordinate set of all points and lines of the component to be printed in a 3D space;
    S2, obtaining a print head configuration and setting a printing parameter;
    S3, obtaining the printing parameter and generating lattice information of the 3D model using an improved slicing algorithm based on a feature of the component to be printed, including:
        S3.1, obtaining a slump degree of a printing concrete material;
        S3.2, determining, based on the slump degree, a minimum circumscribed circle on a horizontal plane and a height h formed by a unit extrusion amount of the printing concrete material within a preset time, initializing j=1;
        S3.3, initializing i=1, $N_j$=0;
        S3.4, obtaining, based on the minimum circumscribed circle and the height, an i-th layer contour of a j-th sub-component to be printed from bottom to top, and generating a first point arrangement graph by tangentially arranging points within and along the i-th layer contour using the minimum circumscribed circle, wherein outermost points of the first point arrangement graph are connected to form a bottom contour;

S3.5, calculating, based on the first point arrangement graph and a height of a current layer, an extrusion amount required to supplement the printing concrete material at positions other than a contour of the current layer, wherein extrusion points for supplementing the printing concrete material form a second point arrangement graph;

S3.6, calculating a corrected height after supplementing the printing concrete material to obtain a slice height hi of the i-th layer;

S3.7, calculating a total slice height $H_{temp}$ of a current sub-component to be printed, and if $H_{temp}$ is less than a height H of the current sub-component to be printed and $(H-H_{temp})/h > \alpha$, $\alpha \in =(1,1.5]$, incrementing i by 1 and returning to S3.4, otherwise, proceeding to S3.8;

S3.8, designating a value of $H-H_{temp}$ as a height limit, calculating an extrusion amount of the printing concrete material based on the slump degree of the printing concrete material to obtain a temporary minimum circumscribed circle, and generating a third point arrangement graph based on the temporary minimum circumscribed circle, incrementing i by 1, assigning a value of $N_j+i$ to $N_j$, and proceeding to S3.9;

S3.9, if unsliced sub-components to be printed exist, incrementing j by 1 and returning to S3.3, otherwise, proceeding to S3.10; and S3.10, constructing a lattice information set for N layers of the component to be printed, wherein $$N = \sum_{j=1}^{J} N_j,$$

and J denotes a total count of sub-components to be printed;

S4, controlling one or more print heads to perform 3D printing based on the lattice information; and S5, post-processing a printed component to obtain a finished product.

2. The method of claim 1, wherein, in S3, the feature of the component to be printed includes whether the component to be printed is hollow;

if the component to be printed is hollow, each of the sub-components to be printed has an independent hollow space, and partition layers are arranged between a plurality of adjacent sub-components to be printed;

if the component to be printed is non-hollow, the sub-components to be printed are non-hollow, and the component to be printed is divided into a plurality sub-components to be printed based on a visible horizontal plane of the component to be printed in a horizontal projection plane.

3. The method of claim 2, wherein, for the partition layers or the non-hollow sub-components to be printed, the printing concrete material is filled between lattice points in each layer, and a filled layer height after filling the printing concrete material is controlled to meet a design height of the current layer.

4. The method of claim 1, wherein, the lattice information set includes coordinates of lattice points and an output amount of the printing concrete material corresponding to each of the lattice points.

5. The method of claim 1, wherein, for any layer of any sub-component to be printed, printing of the first point arrangement graph, the second point arrangement graph, or the third point arrangement graph is completed by a plurality of print heads simultaneously.

6. The method of claim 5, wherein, if a distance between two adjacent print heads of the plurality of print heads during the printing of the first point arrangement graph, the second point arrangement graph, or the third point arrangement graph exceeds a preset value, a steel mesh is placed between output points of the two adjacent print heads.

7. The method of claim 1, wherein, in S4, the component to be printed is printed at a predetermined workstation, and after completing the printing of each layer of the component to be printed, a top-view image of the current layer is acquired to locate and calibrate a cutting line; and in S5, the post-processing includes leveling and curing the printed component based on the cutting line.

* * * * *